Feb. 23, 1954 — M. COTTINGHAM — 2,669,949
DOUGHNUT MAKING MACHINE
Filed Oct. 18, 1951 — 3 Sheets-Sheet 2
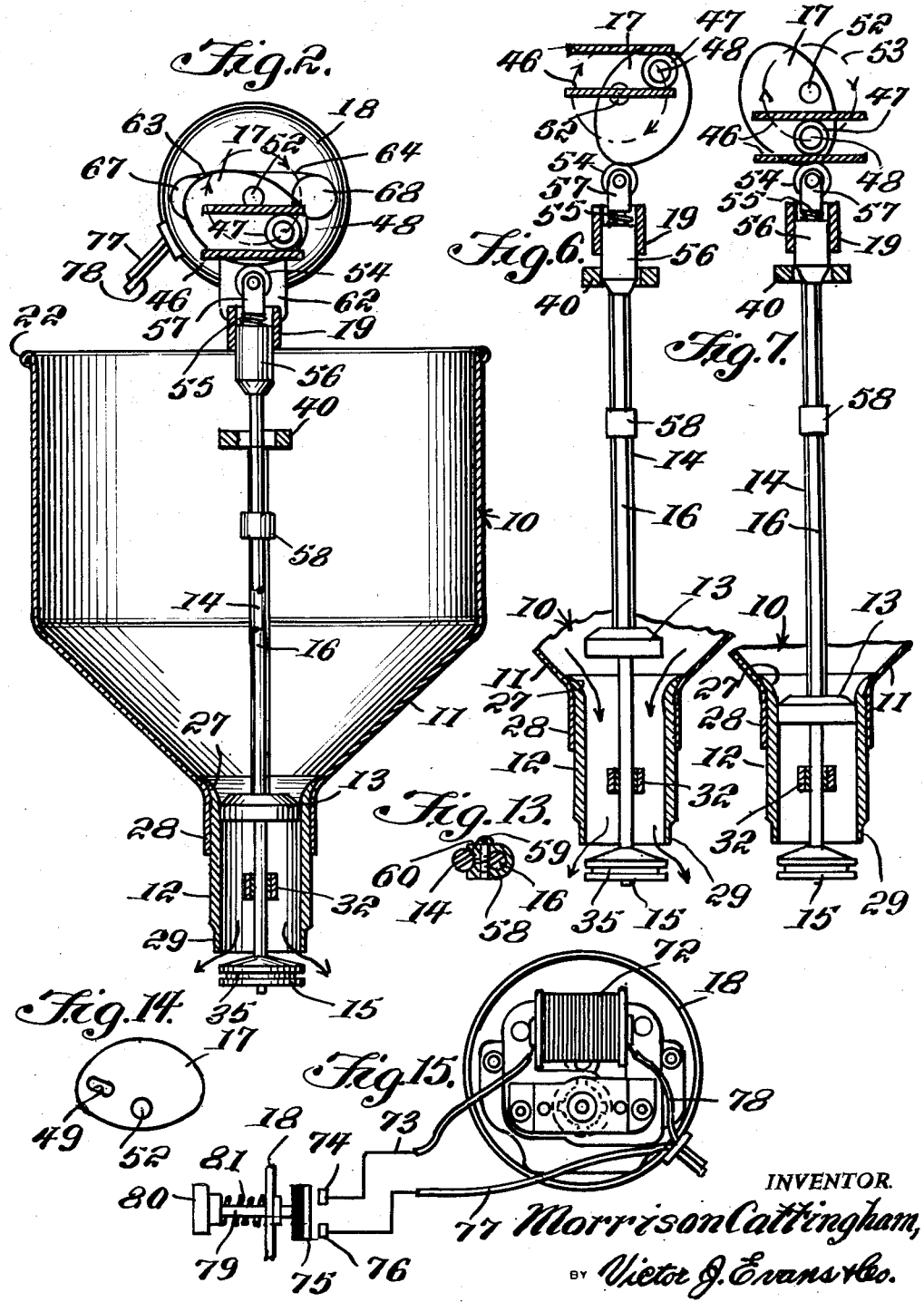
INVENTOR.
Morrison Cottingham,
BY Victor J. Evans & Co.
ATTORNEYS Feb. 23, 1954   M. COTTINGHAM   2,669,949
DOUGHNUT MAKING MACHINE
Filed Oct. 18, 1951   3 Sheets-Sheet 3
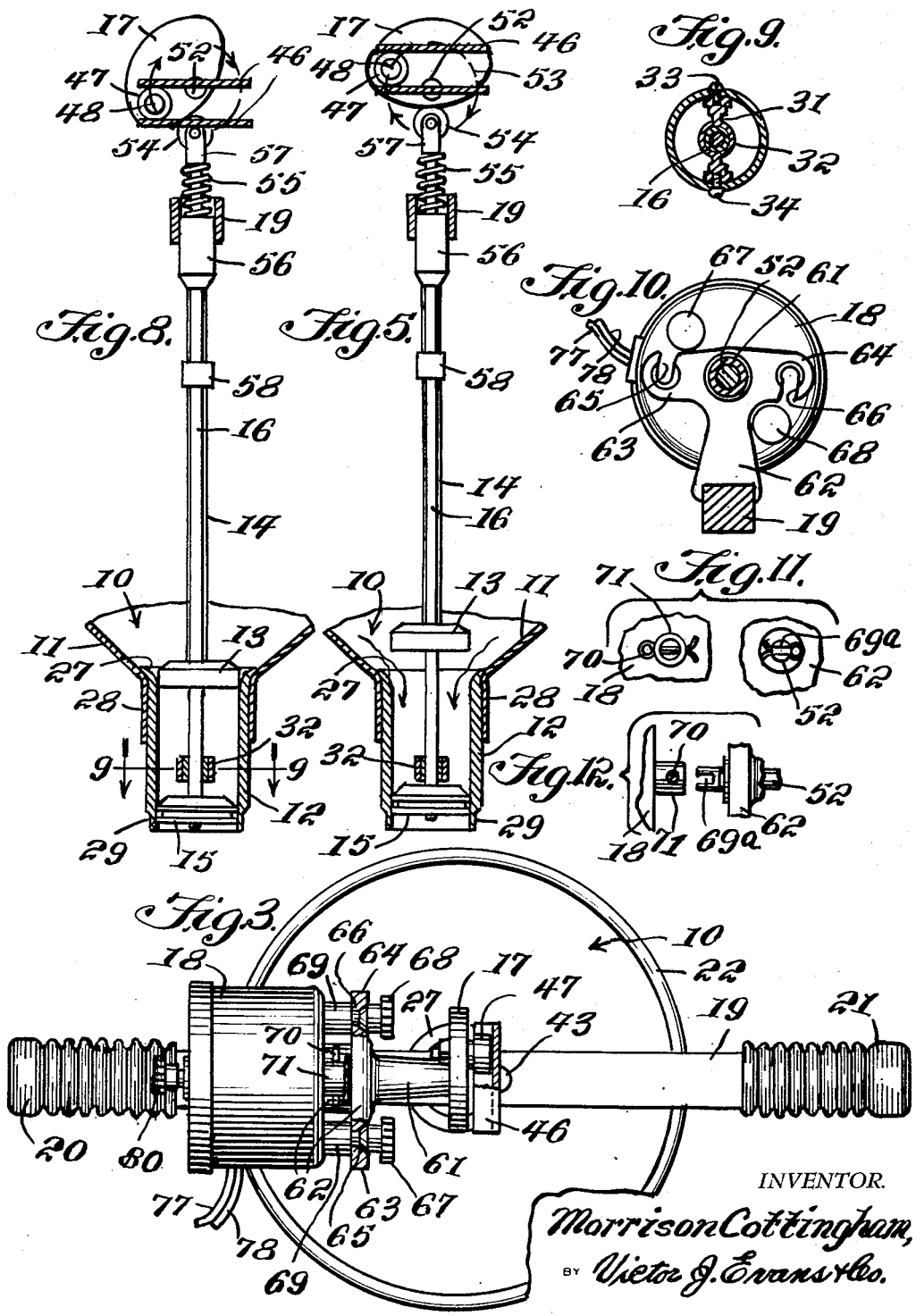
INVENTOR.
Morrison Cottingham,
BY Victor J. Evans & Co.
ATTORNEYS Patented Feb. 23, 1954

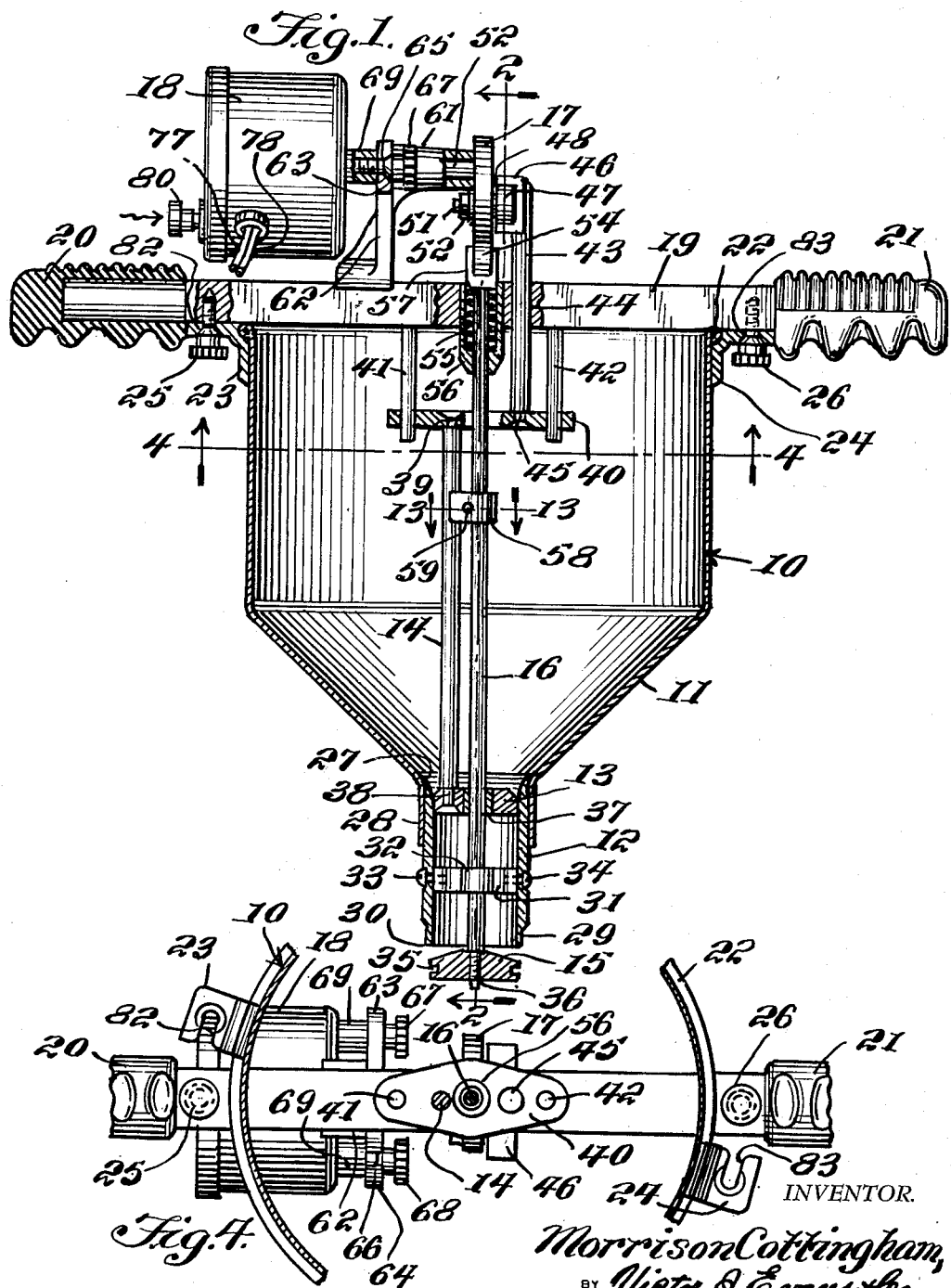

2,669,949

UNITED STATES PATENT OFFICE 2,669,949

DOUGHNUT MAKING MACHINE

Morrison Cottingham, Shreveport, La., assignor to W. R. Stephens Investment Company, Inc., Little Rock, Ark., a corporation of Arkansas Application October 18, 1951, Serial No. 251,946

3 Claims. (Cl. 107—14)

This invention relates to machines for discharging dough in rings for making doughnuts, and in particular a hopper having a cylindrical spout at the lower end of a conical shaped section with discs positioned to travel in said cylindrical spout and with a motor and cam combination mounted on a bar having handles on the ends positioned on the upper end of the hopper and connected with rods to said disc.

The purpose of this invention is to provide a comparatively small doughnut machine whereby relatively small restaurants, using a doughnut mix, may drop comparatively small quantities of dough rings into heated oil or the like thereby making it possible to maintain a supply of fresh doughnuts on hand continuously.

With the conventional doughnut making machine where doughnuts are made in large quantities it has not proved profitable to operate the machine for making small quantities of doughnuts and for this reason the machines are operated once a day or even several times a week and doughnuts offered to the trade generally are not desirable. With this thought in mind this invention contemplates a complete doughnut forming machine that is held by hand over a pan of hot oil or grease and that may be operated to drop as many dough rings as desired.

The object of this invention is, therefore, to provide means for forming an improved doughnut machine whereby dough rings for making doughnuts may be formed in small quantities.

Another object of the invention is to provide a doughnut forming machine in which doughnuts formed on the machine are uniform in size.

Another object of the invention is to provide a doughnut forming machine in which the machine is actuated by an independent motor mounted directly upon a dough retaining hopper thereof.

A further object of the invention is to provide a doughnut making machine for supplying doughnuts in comparatively small quantities which is of a simple and economical construction.

With these and other objects and advantages in view the invention embodies a hopper having a conical shaped lower section with a cylindrical spout extended from the lower end of the conical shaped section, with independently actuating discs slidably mounted in said cylindrical spout with a mounting bar extended across the upper end of the hopper and with a motor, cam and rod combination mounted on the bar and positioned to actuate the discs.

Other features and advantages of the invention will appear from the following description taken in connection with the drawings wherein:

Figure 1 is a vertical section through the improved doughnut machine with parts thereof shown in elevation.

Figure 2 is a similar section through the machine taken on line 2—2 of Figure 1.

Figure 3 is a plan view of the machine with parts broken away.

Figure 4 is a cross section through the hopper of the machine taken on line 4—4 of Figure 1 and looking upwardly toward the under side of the motor and cam mounting positioned on the upper end of the hopper.

Figure 5 is a detail showing a section similar to that shown in Figure 2 illustrating the position of the cams and discs with the lower disc closing the spout and with the upper disc elevated to permit dough to pass into the spout.

Figure 6 is a similar section showing the lower disc moved downwardly by the cam.

Figure 7 is also a similar section showing the lower disc in the lower position and the upper disc in the position of forcing the dough through the spout.

Figure 8 is a similar section showing the lower disc returned to the position of closing the lower end of the spout and showing the upper disc in the upper end of the spout.

Figure 9 is a cross section through the spout taken on line 9—9 of Figure 8.

Figure 10 is a section through the upper part of the machine showing the motor mounting.

Figure 11 is a detail showing a cotter pin extended through the tubular motor shaft.

Figure 12 is a detail showing the cam operating shaft spaced from the end of the motor shaft.

Figure 13 is a section taken on line 13—13 of Figure 1 showing a guide carried by the cam actuated rod and providing a guide for the cam actuated rod.

Figure 14 is a detail showing the cam.

Figure 15 is a diagrammatic view showing the end of the motor with the switch connections thereto.

Referring now to the drawings wherein like reference characters denote corresponding parts the improved doughnut forming machine of this invention includes a hopper 10 having a conical shaped lower section 11 with a cylindrical spout 12 extended from the lower end, an upper disc 13 carried on the end of a rod 14, a lower disc 15 carried on the end of a rod 16, a cam 17, a motor 18 and a mounting bar 19, the ends of which are provided with handles or grips 20 and 21.

The hopper 10 is provided with a continuous bead 22 around the upper edge and the mounting bar 19, which rests upon the upper surface of the bead is secured in position by brackets 23 and 24 with thumb screws 25 and 26, respectively, extended through the brackets and threaded into the ends of the bar.

The cylindrical spout 12, which is formed with an outwardly flared upper end 27 is secured in a sleeve 28 extended downwardly from the lower end of the conical shaped section 11 and the lower end of the spout is provided with a section 29 of reduced diameter which provides a comparatively thin cutting edge 30 that coacts with the peripheral edge on the upper side of the disc 15 to cut the conventional opening in the center of the dough forced from the lower end of the spout.

The spout 12 is provided with a spider 31 having a boss 32 at the center in which the rod 16 is slidably mounted, and the ends of the spider are secured to the walls of the spout with screws 33 and 34.

The lower disc 15, which is provided with an annular recess 35 is threaded on a stud 36 at the lower end of the rod 16 and the upper disc 13 is provided with a bearing 37 through which the rod 16 slides.

The lower end of the rod 14, on which the disc 13 is carried, is provided with a stud 38 and the lower end of the stud is peened or riveted to secure the disc 13 in position thereon.

The upper end of the rod 14 is mounted by a similar stud 39 in a cross bar 40 and the bar 40 is slidably mounted on pins 41 and 42 that extend downwardly from the under surface of the mounting bar 19.

The cross bar 40 is actuated by a vertically disposed rod 43 that is slidably mounted in an opening 44 in the mounting bar 19 and that is connected by a stud 45 to the cross bar 40. The upper end of the rod 43 is attached to a horizontally disposed channel 46 and the channel 46 is moved upwardly and downwardly by a roller 47 mounted on a stud shaft 48 which extends through a slot 49 in the cam 17. The shaft 48 is secured in position in the slot by a nut 50 which is threaded on a threaded end 51 of the shaft.

With the parts arranged in this manner the rotation of the cam 17 causes the roller 47 to travel around the center and in traveling, as indicated by the broken line 53, the roller, engaging the inner surfaces of the channel 46, carries the channel upwardly and downwardly whereby the cross bar 40 is moved correspondingly by the rod 43 and the cross bar 40 through the rod 14 moves the disc 13 through the different positions illustrated in Figures 5 to 8 inclusive.

At the same time, with the peripheral surface of the cam 17 engaging the roller 54 journaled in the upper end of the rod 16, the disc 15 is moved downwardly by the cam compressing dough in the spout and upon continued movement of the cam from the position shown in Figures 6 and 7 to the position shown in Figures 8 and 5 a spring 55, in a cup shaped casing 56, returns the rod 16 with the disc 15 whereby the disc closes the lower end of the spout. The roller 54 is mounted in a yoke 57, and the upper end of the spring 55 bears against the lower end of the yoke.

A clamp 58, secured on the rod 16 with a screw 59 is provided with a section having an arcuate surface 60 and the surface 60 provides a guide for the rod 14 as shown in Figure 13.

A shaft 52, on which the cam 17 is mounted, is journaled in a hub 61 extended from a bracket 62 and the bracket is mounted on the mounting bar 19.

As illustrated in Figure 10, the bracket is provided with extended arms 63 and 64 and the arms are provided with arcuate slots 65 and 66, respectively, in which thumb screws, 67 and 68, threaded in hubs 69 of the motor housing are positioned with the motor housing secured to the bracket.

The end of the shaft 52 is provided with a slot 69 which is positioned to receive a cotter pin 70 extended through a tubular end 71 of the shaft extended from the motor, this connection being illustrated in Figures 11 and 12.

It will be understood that a motor of any suitable type or design may be used, however, it is preferred to use a motor having comparatively slow speed wherein the motor shaft may be directly connected to the cam. In the design shown the motor 18 is provided with a field winding 72 and the winding is connected by a wire 73 to a terminal 74 of a switch having a contact bar 75 and the opposite terminal 76 of the switch is connected by wire 77 to a source of current supply with a wire extended from the source of current supply connected by a wire 78 to the opposite side of the field winding.

The contact bar 75 is carried by a stem 79 that is slidably mounted in a wall of the motor housing 18 and a button 80 on the outer end of the stem is resiliently held outwardly with a contact bar 75 spaced from the contacts 74 and 76 by a spring 81. By this means the button 80 is pressed inwardly to complete the circuit to the motor and with the button positioned adjacent to the grip 20 on the end of the mounting bar 19 the motor may be turned on and off as desired.

With the parts arranged in this manner the machine may readily be taken apart for cleaning and, as shown in Figure 4 the brackets 23 and 24 by which the mounting bar 19 is attached to the hopper are provided with open slots 82 and 83, respectively, in which the thumb screws 25 and 26 are positioned. The lower disc 15 is readily removed from the lower end of the rod 16 and with the thumb screws 25 and 26 released from the slots 82 and 83 the entire mechanism may readily be removed from the hopper.

Operation

With the parts assembled as illustrated in Figure 1, a batch of dough from a doughnut mix is positioned in the hopper 10 and as the motor is started the discs 13 and 15 are actuated from the positions shown in Figure 1 to the positions shown in Figure 5 in which the dough in the hopper travels downwardly in the cylindrical spout and with continuous movement of the cam the upper disc moves downwardly with the lower disc remaining in the lower end of the spout whereby the dough is compressed. With continuous movement to the position shown in Figure 7, the upper disc drops downwardly into the cylindrical and the lower disc remains stationary whereby the dough is expanded forming a ring with the conventional hole in the center. The upper discs then continues downwardly, as illustrated in Figure 7, and the lower disc travels upwardly to close the lower end of the spout, as illustrated in Figure 8. This completes a cycle of operations and as the motor continues to rotate the discs move from the position shown in Figure 8 to that shown in Figure 2 wherein all dough remaining in the lower part of the spout is forced outwardly.

It will be understood that modifications may be made in the design and arrangement of the parts without departing from the spirit of the invention.

What is claimed is:

1. A doughnut forming unit for use on a dough hopper having a vertically disposed depending spout comprising upper and lower vertically spaced discs positioned to slide longitudinally in said spout, a mounting bar positioned on the hopper, spaced vertically disposed pins depending from said mounting bar, a cross bar slidably mounted on said pins, means connecting the cross bar to the upper disc, a cam journaled on the mounting bar, a roller mounted on one side of the cam, a rod having a horizontally disposed channel on the upper end extended from the cross bar, slidably mounted in the mounting bar, and positioned whereby the channel extends over the roller of the cam, a rod extended upwardly from the lower disc, through the upper disc, and having a roller journaled in the upper end, means resiliently urging the rod with the roller thereon upwardly with the roller engaging the surface of the cam, and means for rotating the cam.

2. A doughnut forming unit for use on a dough hopper having a vertically disposed depending spout comprising upper and lower vertically spaced discs positioned to slide longitudinally in said spout, a mounting bar positioned on the hopper, spaced vertically disposed pins depending from said mounting bar, a cross bar slidably mounted on said pins, a rod spaced laterally from the center of the spout and positioned with one end connected to the cross bar and the other to the upper disc, a cam journaled on the mounting bar, a roller mounted on one side of the cam, a rod having a horizontally disposed channel on the upper end extended from the cross bar, slidably mounted in the mounting bar, and positioned whereby the channel extends over the roller of the cam, a rod extended upwardly from the lower disc, through the upper disc, and having a roller journaled in the upper end, a spring positioned around said rod for urging the rod with the roller thereon upwardly with the roller engaging the surface of the cam, and means for rotating the cam.

3. A doughnut forming unit for use on a dough hopper having a vertically disposed depending spout comprising upper and lower vertically spaced discs positioned to slide longitudinally in said spout, a mounting bar positioned on the hopper, spaced vertically disposed pins depending from said mounting bar, a cross bar slidably mounted on said pins, a rod spaced laterally from the center of the spout and positioned with one end connected to the cross bar and the other to the upper disc, a cam journaled on the mounting bar, a roller mounted on one side of the cam, a rod having a horizontally disposed channel on the upper end extended from the cross bar, slidably mounted in the mounting bar, and positioned whereby the channel extends over the roller of the cam, a rod extended upwardly from the lower disc, through the upper disc, and having a roller journaled in the upper end, a spring positioned around said rod for urging the rod with the roller thereon upwardly with the roller engaging the surface of the cam, means for rotating the cam, a spider having openings therethrough positioned in the spout and providing a guide for the rod extended upwardly from the lower disc, and a clamp secured to the rod extended from the lower disc and having a recess therein providing a guide for the rod extended from the upper disc, said mounting bar having handles extended from the ends thereof, said handles positioned on opposite sides of the hopper.

MORRISON COTTINGHAM.

References Cited in the file of this patent

UNITED STATES PATENTS

| Number | Name | Date |
|---|---|---|
| 1,811,564 | Schoel | June 23, 1931 |
| 1,866,061 | Schoel | July 5, 1932 |
| 1,867,307 | Carpenter | July 12, 1932 |
| 1,909,570 | Carpenter | May 16, 1933 |

FOREIGN PATENTS

| Number | Country | Date |
|---|---|---|
| 6,372 | Australia | Mar. 12, 1928 |
| 426,342 | Great Britain | Apr. 1, 1935 |